(12) United States Patent
Matthews

(10) Patent No.: US 6,311,239 B1
(45) Date of Patent: Oct. 30, 2001

(54) ARCHITECTURE, CIRCUITRY AND METHOD FOR TRANSMITTING N-BIT WIDE DATA OVER M-BIT WIDE MEDIA

(75) Inventor: Joe P. Matthews, Savage, MN (US)

(73) Assignee: Cypress Semiconductor Corp., San Jose, CA (US)

( * ) Notice: Subject to any disclaimer, the term of this patent is extended or adjusted under 35 U.S.C. 154(b) by 0 days.

(21) Appl. No.: 09/182,561

(22) Filed: Oct. 29, 1998

(51) Int. Cl.[7] .............................. H04Q 11/04; H04J 3/16; G06F 7/38; G06F 3/00; G06F 15/76
(52) U.S. Cl. ............................... 710/66; 710/62; 710/65; 710/126; 710/127; 708/551; 712/225; 370/471
(58) Field of Search ................................ 710/66, 127, 62, 710/65, 126; 712/225; 717/5; 708/551; 370/471; 375/220

(56) References Cited

U.S. PATENT DOCUMENTS

| | | | |
|---|---|---|---|
| 5,390,307 | * | 2/1995 | Yoshida ................... 712/225 |
| 5,479,445 | * | 12/1995 | Kloker et al. ................ 375/220 |
| 5,548,766 | * | 8/1996 | Kaneko et al. ................ 710/127 |
| 5,638,367 | * | 6/1997 | Gaytan et al. ................ 370/471 |
| 5,717,946 | * | 2/1998 | Satou et al. ................ 712/225 |
| 5,802,399 | * | 9/1998 | Yumoto et al. ................ 710/66 |
| 5,809,306 | * | 9/1998 | Suzuki et al. ................ 717/5 |
| 5,941,941 | * | 8/1999 | Hasegawa ................ 708/551 |

FOREIGN PATENT DOCUMENTS

| | | | |
|---|---|---|---|
| 228745A2 | * | 7/1987 | (EP) ................... G09G/1/16 |
| 752800A2 | * | 1/1997 | (EP) ................... H04Q/11/04 |
| 8018916A | * | 1/1996 | (JP) ................... H04N/5/92 |

OTHER PUBLICATIONS

Lettieri et al. "Low Power Error Control for Wireless Links", Proceedings of the Third Annual ACM/IEEE International Conference on Mobile Computing and Networking, 1997, pp. 139–150.*

Schneider, C. "A Parallel/Serial Trade–Off Methodology for Look–Up Table Based Decoders", Proceedings of the 34th Annual Conference on Design Automation Conference, 1997, pp. 498–503.*

Pan et al. "Computation of Singular Value Decomposition on Arrays With Pipelined Optical Buses", Proceedings of the 1993 ACE/SIGAPP Symposium on Applied Computing, 1993, pp. 525–532.*

Cypress Semiconductor Corp., Data Communication Data Book, 1996, 4–1 to 4–27.

* cited by examiner

*Primary Examiner*—Thomas Lee
*Assistant Examiner*—Katharina Schuster
(74) *Attorney, Agent, or Firm*—Christopher P. Maiorana, P.C.

(57) ABSTRACT

An architecture, circuitry and method for transmitting n-bit wide data over m-bit wide media that may comprise a first circuit configured to present a first series of data packets having a first bit-width in response to a second series of data packets having a second bit-width and a second circuit configured to present a third series of data packets having said first bit-width in response to said second series of data packets. The first circuit may comprise a buffer circuit configured to hold one or more of the first series of data packets and a packer circuit configured to present the second series of data packets in response to the data packets held in the buffer circuit. The second circuit may comprise an unpacker circuit configured to present the third series of data packets and a buffer circuit configured to hold one or more of the third series of data packets.

15 Claims, 3 Drawing Sheets

ARCHITECTURE, CIRCUITRY AND METHOD FOR TRANSMITTING N-BIT WIDE DATA OVER M-BIT WIDE MEDIA

FIELD OF THE INVENTION

The present invention relates to data transmission generally and, more particularly, to an architecture, circuitry and method for transmitting n-bit wide data over m-bit wide media.

BACKGROUND OF THE INVENTION

Conventional approaches for the binary transmission of a first bit width (e.g., a 10-bit wide) data over a second bit width (e.g., 8-bit transmission) media would be to use a 10–12-bit transmission code (i.e., TAXI). Another solution would be to use scrambler transmission codes which accept 10-bit wide parallel data as an input to the encoding or output of the decoding. Another approach would be to bypass the encoding altogether and transmit the 10-bits directly. This type of conventional approach requires the incoming data from the bus to have the proper transition density which the 8b10b encoding guarantees.

Conventional approaches place the responsibility of encoding or scrambling of data, to ensure meeting minimum transmission densities, on the user. Other transmission codes such as TAXI may not guarantee minimum transition densities in a situation where 8b10b decoding will provide such guarantees. Without a minimum density, the overall performance of the system may be inhibited.

SUMMARY OF THE INVENTION

The present invention concerns an architecture, circuitry and method for transmitting n-bit wide data over m-bit wide media that may comprise a first circuit configured to present a first series of data packets having a first bit-width in response to a second series of data packets having a second bit-width and a second circuit configured to present a third series of data packets having said first bit-width in response to said second series of data packets. The first circuit may comprise a buffer circuit configured to hold one or more of the first series of data packets and a packer circuit configured to present the second series of data packets in response to the data packets held in the buffer circuit. The second circuit may comprise an unpacker circuit configured to present the third series of data packets and a buffer circuit configured to hold one or more of the third series of data packets.

The objects, features and advantages of the present invention include providing a system solution for seamless transmission of N-bit (e.g., 10-bit) data words over M-bit (e.g., 8-bit) serial links using a byte oriented binary (i.e., serial) transmission code. The present invention may provide an efficient method for transmitting bit wide data requiring while using conventional 8b10b encoding/decoding schemes for serial portion of the transmission.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
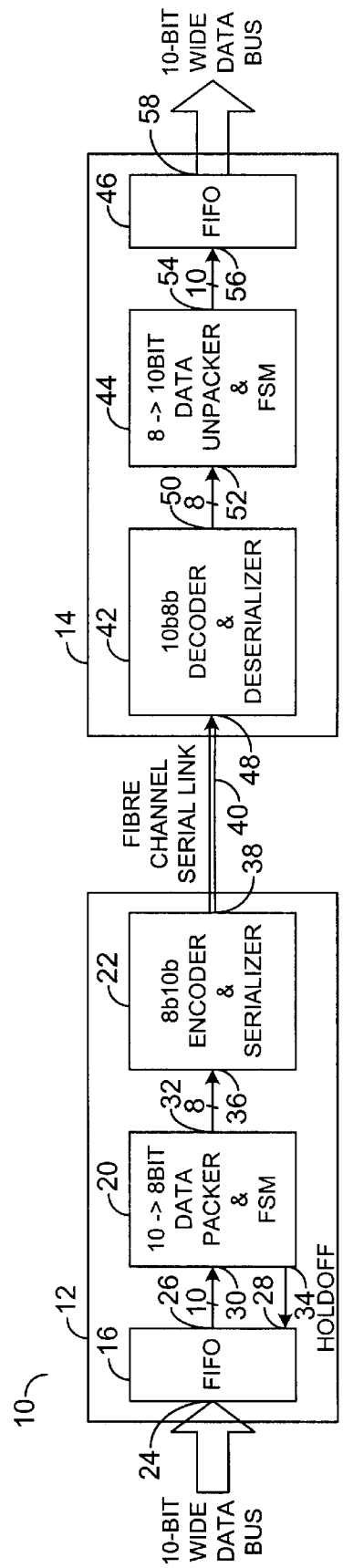
FIG. 1 is a block diagram of the present invention.

Referring to FIG. 1, a block diagram of a circuit 10 illustrating a preferred embodiment of the present invention is shown. The circuit 10 generally comprises a transmit block (or circuit) 12 and a receive block (or circuit) 14. The transmit block 12 generally comprises a buffer (such as first-in first-out FIFO) 16, a data packer 20 and an encoder 22. The FIFO 16 may have an input 24 that may be coupled to an N-bit wide data bus and may receive a series of N-bit wide data words. The N-bit data words may be, in one example, 10-bit data words. However, other width data words may be implemented to meet the design criteria of a particular application. The FIFO 16 may also have an output 26 and an input 28. The output 26 may present the N-bit data words to an input 30 of the data packer circuit 20. The data packer circuit 20 may have an output 32 and an output 34. The output 34 may present a control signal (e.g., HOLDOFF) to the input 28. The output 32 may present a series of M-bit data packets to an input 36 of the encoder block 22. The encoder 22 may have an output 38 that may present information to a serial link 40. The serial link 40 may be, in one example, a fiber channel serial link. While certain standard fiber channel serial links may be 8-bits wide, the present encoder 22 may be adapted to present a variety of bit widths to meet the design criteria of a particular implementation.

The receiver block 14 may comprise a decoder block (or circuit) 42, a data unpacker block (or circuit) 44 and a buffer 46 (such as a FIFO). The decoder block 42 may have an input 48 that may receive the M-bit data from the link 40. The decoder 42 may have an output 50 that may present the M-bit data to an input 52 of the data unpacker block 44. The data unpacker block 44 may have an output 54 that may present N-bit data to an input 56 of the FIFO 46. The signal presented at the output 50 may be a series of m-bit words, while T he signal presented at the output 5 4 may be a series of N-bit words. The FIFO 46 may have an output 58 and may present information to a data bus. The encoder 22 and the decoder 42 may be implemented, in one example, as standard fiber channel 8b10b encoders and 10b8b decoders, respectively. An example of such an encoder 22 and decoder 42 may be found in Cypress Semiconductor Data Book: Data Communications, 1996, which is hereby incorporated by reference. In particular the HOTLink™ Transmitter/Receivers on pages 4-1 to 4-28 are examples of circuits that may be used for the encoder 22 and the decoder 42.

Figure 2:
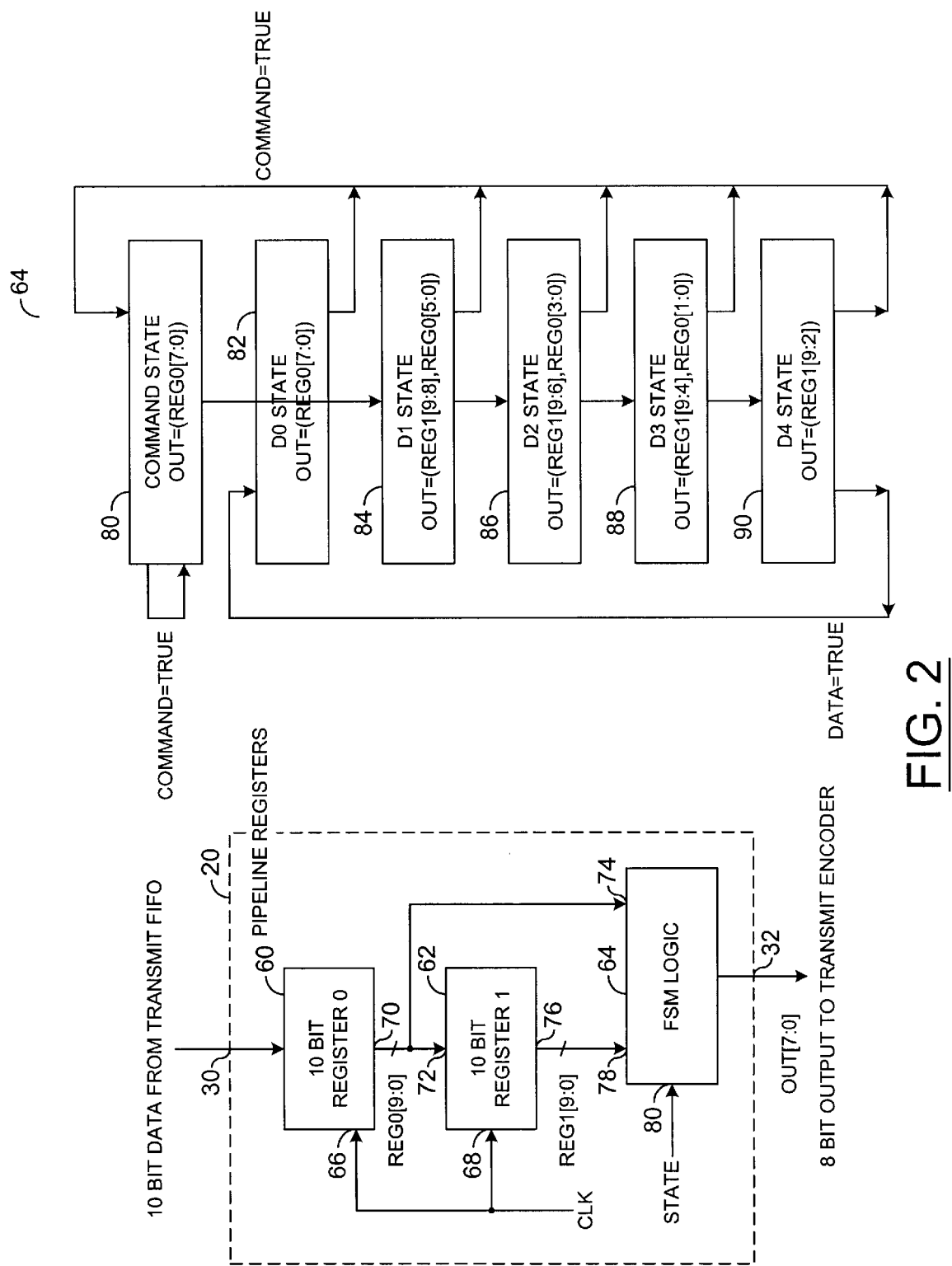
FIG. 2 is a block diagram of the logic of the transmit state machine of FIGS. 1.

Referring to FIG. 2, a block diagram of the data packer 20 is shown. The data packer 20 generally comprises a register 60, a register 62 and a logic block (or circuit) 64. The logic block 64 may be implemented as a finite state machine (FSM). The register 60 generally comprises input 66 that may receive a clock signal (e.g., CLK). Similarly, the register 62 may have an input 68 that may receive the clock signal CLK. The register 60 may also have an output 70 that may present a signal (e.g., REG[9:0]) that may be presented to the input 72 of the register 62 as well as to an input 74 of the logic block 64. The register 62 may have an output 76 that may present a signal (e.g., REG1[9:0]) that may be received at an input 76 of the logic block 64. The logic block 64 may also have an input 80 that may receive a signal (e.g., STATE). The logic 64 presents a signal (e.g., OUT[7:0]) in response to the signals received at the inputs 74, 78 and 80. The register 62 generally provides a one clock cycle delay of the data received at the input 30.

The logic block 64 generally comprises a state 80, a state 82, a state 84, a state 86, a state 88 and a state 90. The following example describes the conversion of 10-bit data to an 8-bit output. The state 80 may be implemented as a command state where the signal OUT is equal to bits [7:0] of the register 60. The logic 64 may exit the state 80 and may enter the state 84 if a control signal (e.g., DATA) is active, or true. If a control signal (e.g., COMMAND) is active, or true, the logic 64 may stay in the state 80.

The state 84 may be a D1 state where the signal OUT is equal to bits [9:8] of the register 62 and bits [5:0] of the register 60. If the control signal COMMAND is active, or true, the logic 64 may exit the state 84 and may enter the state 80. If the control signal DATA is active, or true, the logic 64 may exit the state 84 and may enter the state 86.

The state 86 may be a D2 state where the signal OUT may be equal to bit [9:6] of the register 62 and bits [3:0] of the register 60. If the signal DATA remains true, the logic 64 may progress to the state 88. If the signal COMMAND is true, the logic may exit the state 86 and may enter the state 80.

The state 88 may be a D3 state where the signal OUT may be equal to bits [9:4] of the register 62 and bits [1:0] of the register 60. If the signal DATA is true, the logic 64 may exit the state 88 and may enter the state 90. If the signal COMMAND is true, the logic 64 may exit the state 88 and may enter the state 80.

The state 90 may be a D4 state where the signal OUT may be equal to bits [9:2] of the register 62. If the signal DATA is true, the logic may exit the state 90 and may enter the state 82. If the signal COMMAND is true, the logic may exit the state 90 and may enter the state 80. The state 82 may be a D0 state where the signal OUT may be equal to bits [7:0] of the register 60. The logic may exit the state 82 and may enter the state 80 if the signal COMMAND is true.

Figure 3:
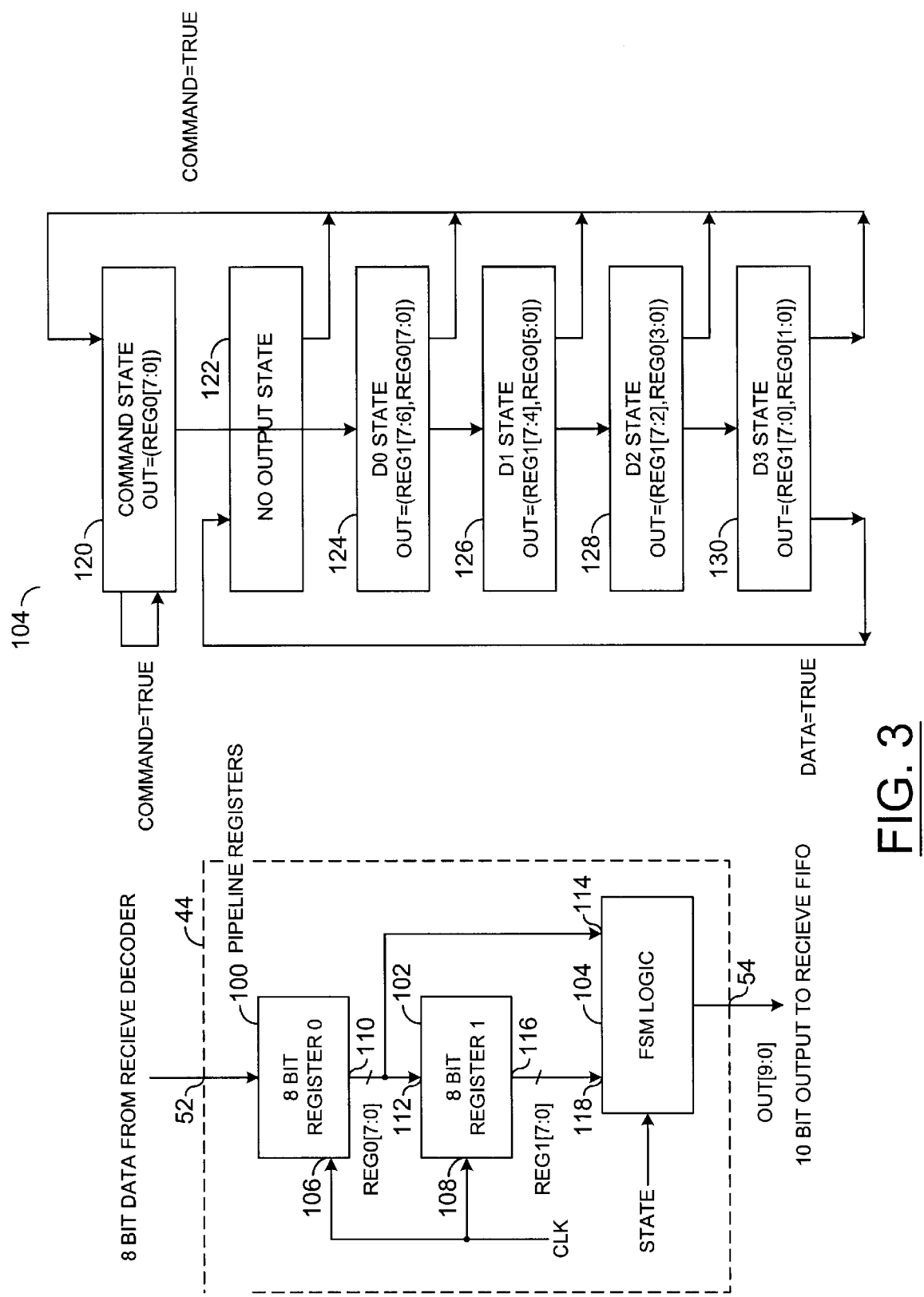
FIG. 3 is a diagram of the logic of the receive state machine of FIG. 1.

Referring to FIG. 3, a block diagram of the logic 44 is shown. The block 44 generally comprises a register 100, a register 102 and a logic block (or circuit) 104. The register 100 and the register 102 generally receive the signal CLK at an input 106 and an input 108, respectively. The register 100 generally comprises an output 110 that may present information to an input 112 of the register 102 as well as to an input 114 of the logic block 104. The register 102 may have an output 116 that may present information to an input 118 of the state machine 104. The signal OUT may be a 10-bit signal presented to the FIFO 46.

The logic 104 generally comprises a state 120, a state 122, a state 124, a state 126, a state 128 and a state 130 that generally correspond to the states 80–90 of the logic 64. However, the particular bits presented by each of the states 120–130 is slightly modified from the logic of 64. For example, the state 120 may present the signal OUT as bits [7:0] of the register 100. The state 124 generally presents the signal OUT as the bits [7:6] of the register 102 and the bits [7:0] of the register 100. The state 126 may present the signal OUT as bits [7:4] of the register 102 and bits [5:0] of the register 100. The state 128 generally presents the signal OUT as bits [7:0] of the register 102 and bits [3:0] of the register 100. The state 130 generally presents the signal OUT as bits [7:0] of the register 102 and bits [1:0] of the register 100. The logic 64 and 104 may be implemented in discrete logic, a programming language (such as verilog hardware description language (HDL) as defined by the IEEE 1364-1995 standard) or any other appropriate implementation.

While the invention has been particularly shown and described with reference to the preferred embodiments thereof, it will be understood by those skilled in the art that various changes in form and details may be made without departing from the spirit and scope of the invention.

What is claimed is:

1. A circuit comprising:
    a first circuit comprising a packer circuit and an encoder/serializer circuit, wherein said first circuit is configured to receive a first series of data packets having a first bit-width and present a second series of data packets having a second bit-width in response to said first series of data packets; and
    a second circuit comprising a decoder/deserializer circuit and an unpacker circuit, wherein said second circuit is configured to present a third series of data packets having said first bit-width in response to said second series of data packets.

2. The circuit according to claim 1, wherein said first circuit further comprises:
    a buffer circuit configured to hold one or more of said first series of data packets.

3. The circuit according to claim 1, wherein said second circuit comprises:
    a buffer circuit configured to hold one or more of said third series of data packets.

4. The circuit according to claim 1, wherein said second series of data packets are presented on a serial link.

5. The circuit according to claim 4, wherein said serial link comprises a fiber channel serial link.

6. The circuit according to claim 5, wherein said encoder/serializer circuit and said decoder/deserializer circuit comprise 8b10b compliant devices.

7. The circuit according to claim 1, wherein said packer circuit comprises:
    a first register configured to receive data packets having said first bit-width from said buffer circuit and present data packets having said first bit-width to a second register and a finite state machine in response to a clock signal;
    said second register configured to present data packets having said first bit-width to said finite state machine in response to said clock signal; and
    said finite state machine configured to present data packets having said second bit-width.

8. The circuit according to claim 1, wherein said unpacker circuit comprises:
    a first register configured to receive data packets having said second bit-width and present data packets having said second bit-width to a second register and a finite state machine in response to a clock signal;
    said second register configured to present data packets having said second bit-width to said finite state machine in response to said clock signal; and
    said finite state machine configured to present data packets having said first bit-width to said buffer circuit.

9. A circuit comprising:
    means for receiving a first series of data packets having a first bit-width and presenting a second series of data packets having a second bit-width in response to said first series of data packets, said receiving means comprising a packer circuit and an encoder/serializer circuit; and
    means for presenting a third series of data packets having said first bit-width in response to said second series of data packets, said presenting means comprising a decoder/deserializer circuit and an unpacker circuit.

10. A method for transmitting data having a first bit-width over media having a second bit-width comprising the steps of:

(a) receiving a first series of data packets having said first bit-width, generating a second series of data packets having said second bit-width in response to said first series of data packets, and packing, encoding/serializing, and presenting said second series of data packets to said media; and (b) receiving, decoding/deserializing, and unpacking said second series of data packets, and generating a third series of data packets having said first bit-width in response to said second series of data packets.

11. The method according to claim 10, wherein steps (a) further comprises the steps of:

(a-1) buffering one or more of said first series of data packets; and (a-2) generating said second series of data packets in response to said buffered data packets.

12. The method according to claim 10, wherein step (b) comprises the steps of:

(b-1) generating said third series of data packets; and (b-2) buffering one or more of said third series of data packets.

13. The method according to claim 10, wherein said second series of data packets are presented on a serial link.

14. The method according to claim 13, wherein said serial link comprises a fiber channel serial link.

15. The method according to claim 13, wherein said encoding/serializing and decoding/deserializing steps are 8b10b compliant.

* * * * *